United States Patent
Asthana

(10) Patent No.: US 9,134,937 B2
(45) Date of Patent: Sep. 15, 2015

(54) SECURE PRINTING

(71) Applicant: Hewlett-Packard Development Company, L.P., Houston, TX (US)

(72) Inventor: Prashant Asthana, Bangalore (IN)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 83 days.

(21) Appl. No.: 13/854,406

(22) Filed: Apr. 1, 2013

(65) Prior Publication Data

US 2014/0293324 A1    Oct. 2, 2014

(51) Int. Cl.
*G06F 3/12*    (2006.01)

(52) U.S. Cl.
CPC ............ *G06F 3/1238* (2013.01); *G06F 3/1222* (2013.01); *G06F 3/1285* (2013.01); *G06F 3/1226* (2013.01)

(58) Field of Classification Search
USPC ........................................ 358/1.15; 726/2–12
See application file for complete search history.

(56) References Cited

U.S. PATENT DOCUMENTS

| | | | |
|---|---|---|---|
| 6,721,286 B1 | 4/2004 | Williams et al. | |
| 7,254,400 B1 | 8/2007 | Sakakura | |
| 7,352,485 B2 | 4/2008 | Kinoshita | |
| 7,573,904 B2 | 8/2009 | Pichna et al. | |
| 8,027,049 B2 | 9/2011 | Kinoshita et al. | |
| 8,060,018 B2 | 11/2011 | Davis et al. | |
| 8,346,903 B2 | 1/2013 | Shepherd | |
| 2002/0051178 A1 | 5/2002 | Nakayasu et al. | |
| 2003/0011810 A1* | 1/2003 | Strobel et al. ................ 358/1.15 |
| 2003/0210420 A1 | 11/2003 | Yamauchi | |
| 2003/0235174 A1 | 12/2003 | Pichna et al. | |
| 2004/0137855 A1 | 7/2004 | Wiley et al. | |
| 2005/0149755 A1* | 7/2005 | Shima et al. ................. 713/201 |
| 2005/0170845 A1 | 8/2005 | Moran | |
| 2006/0039349 A1 | 2/2006 | Samuel et al. | |
| 2006/0087682 A1* | 4/2006 | Lee .............................. 358/1.15 |
| 2007/0124436 A1 | 5/2007 | Shepherd | |
| 2007/0217382 A1 | 9/2007 | Minamizawa | |

(Continued)

FOREIGN PATENT DOCUMENTS

JP        2002026895        1/2002
WO     WO-2007082244      7/2007

OTHER PUBLICATIONS

Fernandes, et al. The Mobile Printer Enterprise. Feb. 2012. Quocirca Ltd.

(Continued)

*Primary Examiner* — Benjamin O Dulaney
(74) *Attorney, Agent, or Firm* — Hewlett-Packard Patent Department

(57) ABSTRACT

A system for secure printing is disclosed herein. An example of the system includes a client that initiates a print request, creates an identifier, transmits the print request and identifier, and renders print data. The system also includes a cloud-connected printer and a server to which the cloud-connected printer is coupled that receives the transmitted print request and identifier, verifies the availability of the cloud-connected printer, transfers the identifier to the available cloud-connected printer, and establishes a secure connection between the available cloud connected printer and the client. Other details of the system are disclosed herein, as are other examples of the system. Examples of a method for secure printing and a non-volatile storage medium are also disclosed herein.

14 Claims, 5 Drawing Sheets

(56) References Cited

U.S. PATENT DOCUMENTS

| | | | |
|---|---|---|---|
| 2007/0265003 A1 | 11/2007 | Kezys et al. | |
| 2008/0004075 A1 | 1/2008 | Horton | |
| 2008/0096486 A1 | 4/2008 | Whitten | |
| 2009/0287806 A1 | 11/2009 | Hamilton et al. | |
| 2009/0310570 A1 | 12/2009 | Smith | |
| 2009/0323659 A1 | 12/2009 | Zhang | |
| 2010/0185858 A1* | 7/2010 | Nishimi et al. | 713/168 |
| 2010/0309510 A1* | 12/2010 | Hansen | 358/1.15 |
| 2011/0099264 A1* | 4/2011 | Chapin et al. | 709/224 |
| 2011/0242576 A1 | 10/2011 | Allen et al. | |
| 2012/0057193 A1* | 3/2012 | Jazayeri et al. | 358/1.15 |
| 2012/0084364 A1 | 4/2012 | Sivavakeesar | |
| 2012/0084771 A1 | 4/2012 | Hashimoto et al. | |
| 2012/0218589 A1 | 8/2012 | Watanabe et al. | |
| 2012/0229844 A1 | 9/2012 | Yada et al. | |
| 2012/0268777 A1 | 10/2012 | Fry | |
| 2012/0307298 A1* | 12/2012 | Ishige et al. | 358/1.15 |
| 2012/0324076 A1* | 12/2012 | Zerr et al. | 709/223 |
| 2013/0016392 A1* | 1/2013 | Lee | 358/1.15 |
| 2013/0128306 A1* | 5/2013 | Takahashi | 358/1.15 |
| 2013/0163580 A1* | 6/2013 | Vass | 370/352 |
| 2013/0194623 A1* | 8/2013 | Tecu et al. | 358/1.15 |
| 2013/0250330 A1* | 9/2013 | Chigusa | 358/1.13 |
| 2013/0250358 A1* | 9/2013 | Suzuki | 358/1.15 |
| 2013/0286425 A1* | 10/2013 | Nakamura et al. | 358/1.13 |
| 2014/0134999 A1 | 5/2014 | Scheessele et al. | |

OTHER PUBLICATIONS

Apple Inc., "Messages," iOS, (web page), Oct. 29, 2012, <http://web.archive.org/web/20121029212402/http://www.apple.com/ios/messages/>.

Apple, "Features that go further," iOS 5, Sep. 10, 2012, <http://web.archive.org/web/20120910202047/http://www.apple.com/ios/features.html>.

I. Gruber, et al, "Ad Hoc Routing for Cellular Coverage Extension", Apr. 22-25, 2003, http://ieeexplore.ieee.org/xpls/abs_all.jsp?arnumber=1207137 > on pp. 1816-1820; vol. 3.

TechTarget, "out-of-band signaling," SearchNetworking, Jan. 20, 2012, <http://web.archive.org/web/20120120154228/http://searchnetworking.techtarget.com/definition/out-of-band-signaling>.

Wikipedia, "Out-of-band management," Oct. 24, 2012, <http://en.wikipedia.org/w/index.php?title=Out-of-band_management&oldid=519500148>.

Wikipedia, "Wi-Fi Direct," Oct. 16, 2012, <http://en.wikipedia.org/w/index.php?title=Wi-Fi_Direct&oldid=518220509>.

Wikipedia, "Wi-Fi," Oct. 31, 2012, <http://en.wikipedia.org/w/index.php?title=Wi-Fi&oldid=520677838>.

Hewlett-Packard Development Company, L.P., "Cloud printing in the enterprise: Liberating the mobile print experience from cables, operating systems and physical boundaries," Mar. 2010, <http://www.hubtechnical.com/Collateral/Documents/English-US/HP/11-CloudPrintingintheEnterprise.pdf>.

Hewlett-Packard Development Company, L.P., "HP Access Control Secure Pull Printing," Nov. 2008, <http://h71028.www7.hp.com/enterprise/downloads/HP-Access-Control-Secure-Pull-Printing.pdf>.

Grayson, Wayne; "Google Announces Web App for Printing from Mobile Device", <http://grayson.blogs.tuscaloosanews.com/11308/google-announces-web-app-for-printing-from-mobile-device/> ; Apr. 16, 2010.

Hewlett-Packard Development Company, L.P., "HP ePrint Enterprise mobile printing solution," Mar. 2010, <http://www.hp.com/hpinfo/newsroom/press_kits/2010/MPSSpring2010/pdf/HP_ePrint.pdf>.

Hewlett-Packard Development Company, L.P., "HP ePrint Enterprise mobile printing solution," Sep. 2010, <http://www.hp.com/hpinfo/newsroom/press_kits/2010/InnovationSummit/HP_ePrint_Enterprise_Solution.pdf>.

* cited by examiner

SECURE PRINTING

BACKGROUND

Cloud computing continues to evolve and develop. One of the activities that users of cloud computing may want to engage in is printing. However, there may be a reluctance to do so because of concerns over privacy, security, or otherwise losing sensitive data sent over the cloud for printing.

BRIEF DESCRIPTION OF THE DRAWINGS

The following detailed description references the drawings, wherein.

DETAILED DESCRIPTION

Many consumers, businesses, and enterprises use or want to expand their use of cloud computing resources. One of these resources is cloud-based printing. There is a risk, however, of sending sensitive documents or other information over the cloud for printing, as they can be stored and/or misused. This reluctance to send personal, sensitive, and/or confidential data over the cloud, results in reduced usage of cloud-based printing.

Another difficulty associated with cloud-based printing is that some fonts or characters used in connection with a particular document or other information may not be rendered correctly or at all on a cloud-based printer. This can result in unacceptable printed output from a cloud-based printer, further reducing the usage of cloud-based printing.

Figure 1:
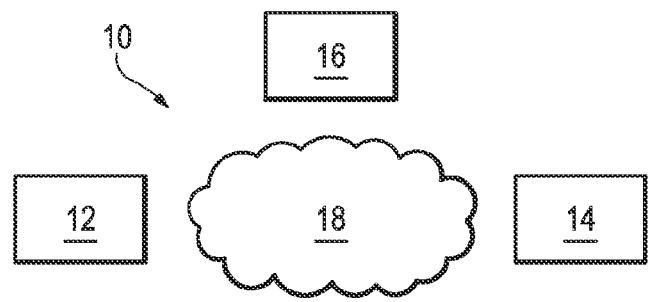
FIG. 1 is an example of a system for secure printing.

An example of a system for secure printing 10 that is directed to addressing these challenges is illustrated in FIG. 1. As used herein, the term "cloud computing" and "cloud" are defined as including, but not necessarily limited to, computing, resources (hardware, software, and firmware) that are delivered as a service over a network (such as the internet).

As used herein, the term "non-volatile storage medium" is defined as including, but not necessarily limited to, any media that can contain, store, retain, or maintain programs, code, scripts, information, and/or data. A non-volatile storage medium may include any one of many physical media such as, for example, electronic, magnetic, optical, electromagnetic, or semiconductor media. More specific examples of suitable non-volatile storage media include, but are not limited to, a magnetic computer diskette such as floppy diskettes or hard drives, magnetic tape, a read-only memory (ROM), an erasable programmable read-only memory (EPROM), a flash drive, a compact disc (CD), a digital video disk (DVD), or a memristor.

As used herein, the term "processor" is defined as including, but not necessarily limited to, an instruction execution system such as a computer/processor based system, an Application Specific Integrated Circuit (ASIC), a computing device, or a hardware and/or software system that can fetch or obtain the logic from a non-volatile storage medium and execute the instructions contained therein. "Processor" can also include any controller, state-machine, microprocessor, cloud-based utility, service or feature, or any other analogue, digital and/or mechanical implementation thereof.

As used herein, the term "server" is defined as including, but not necessarily limited to, a computing device, program, or combination thereof that processes requests, delivers data or other information, or provides one or more services over the cloud and/or a local network. As used herein, the term "client" is defined as including, but not necessarily limited to, hardware, software, or a combination thereof that access a server. Examples include, but are not limited to, a computing device, phone, tablet, personal digital assistant, or server.

As used herein, the term "printer" is defined as including, but not necessarily limited to, a peripheral that produces a representation of a document on one or both sides of media such as paper, transparency, fabric, etc. A printer can be single function or multi-function (e.g., including scanning, faxing, or other functionality). A printer can use any of a variety of different types of marking technologies such as laser, inkjet, dye-sublimation, off-set printing, thermal printing, impact, etc. As used herein, the terms "render" and "rendering" are defined as including, but not necessarily limited to, taking print data such as text, images, graphics, etc. and converting them into a format that is compatible with a destination printer.

Referring again to FIG. 1, system 10 includes a client 12 that initiates a print request, creates an identifier, transmits the print request and identifier, and renders print data. System 10 also includes a cloud-connected printer 14 and a server 16 to which cloud-connected printer 14 is coupled via cloud 18. Server 16 receives the transmitted print request and identifier, verifies the availability of cloud-connected printer 14, transfers the identifier to printer 14 (if available), and establishes a secure connection (such as a peer-to-peer network) between cloud-connected printer 14 (if available) and client 12.

In this example of system 10, if available, cloud-connected primer 14 transmits the identifier to client 12 via the secure connection established by server 16. Client 12 confirms that the identifier received from available cloud-connected printer 14 via the secure connection established by server 16 is the same as the identifier transmitted by client 12. Upon verification of the identifier, client 12 transmits the rendered print data to available cloud-connected printer 14 via the secure connection established by server 16.

Figure 2:
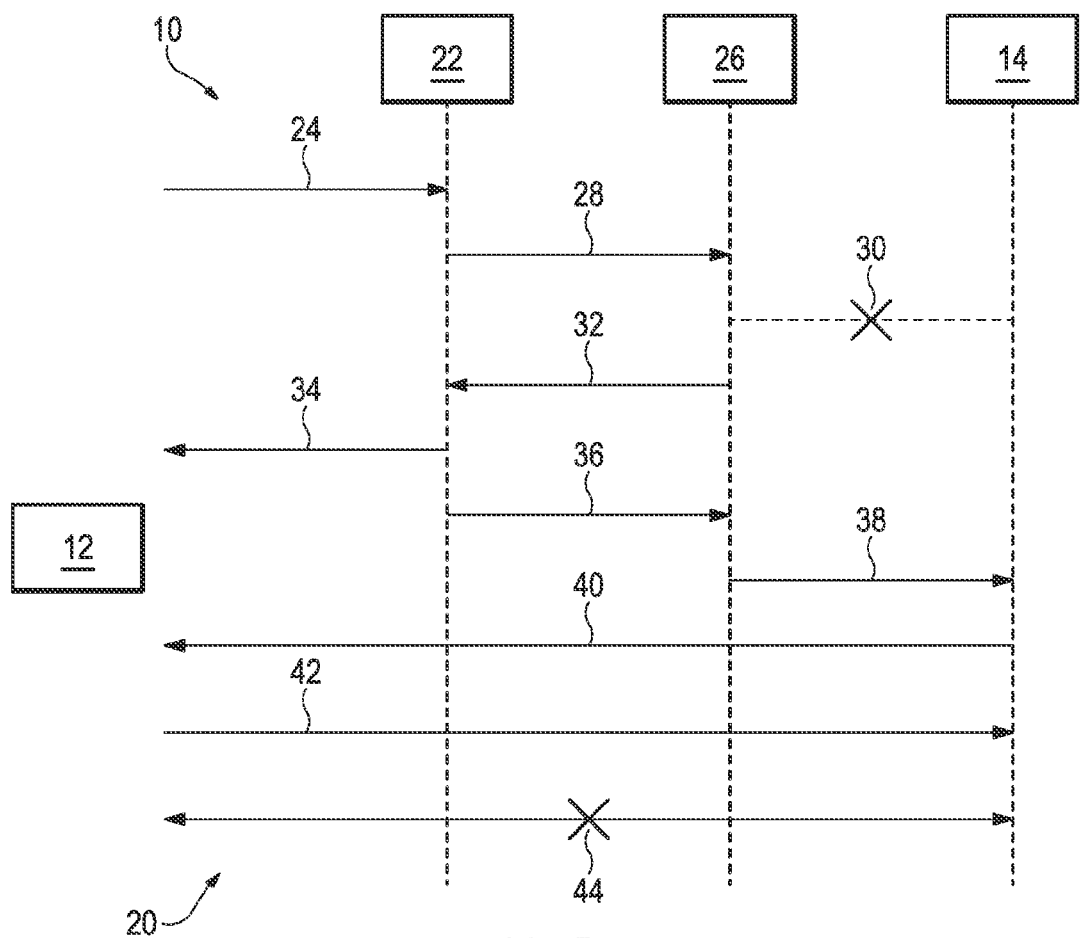
FIG. 2 is an example of a flow diagram for the system of FIG. 1.

An example of a flow diagram 20 for system 10 is shown in FIG. 2. As can be seen in FIG. 2, flow diagram 20 begins by client 12 initiating a secure print request to a signaling server 22, as indicated by arrow 24. This secure print request includes an address for cloud-connected printer 14 along with an identifier. This identifier may be a random number, alpha-numeric sequence, encrypted key, or other type of security code or device. Signaling server 22 in turn checks with extensible messaging and presence protocol (XMPP) server 26 to determine if cloud-connected printer 14 is online and available, as indicated by arrow 28. In the example flow diagram 20 illustrated in FIG. 2, signaling server 22 and XMPP server 26 represent server 16 of FIG. 1.

If cloud-connected printer 14 is off-online or unavailable, as generally indicated by reference numeral 30, then XMPP server 26 relays this information to signaling server 22, as indicated by arrow 32. Signaling server 22 in turn conveys this information to client 12, as indicated by arrow 34, and the secure print request is terminated.

If cloud-connected printer 14 is online and available, then signaling server 22 sends the secure print request to XMPP server 26, as indicated by arrow 36. XMPP server 26 in turn relays the secure print request to cloud-connected printer 14, as indicated by arrow 38. Cloud connected printer 14 in turn establishes a secure extensible messaging and presence protocol (XMPP) connection with client 12, as indicated by arrow 40, and provides the identifier back to client 12. Client 12 confirms or verifies that the identifier received from cloud-connected printer 14 is the same as the one originally sent to signaling server 22. Client 12 then sends or transfers rendered print data for the print request to cloud-connected printer 14 via the secure connection, as indicated by arrow 42, if the identifier from cloud-connected printer 14 is verified or confirmed. If the identifier received from cloud-connected printer 14 is not confirmed or verified by client 12, then no rendered print data is transferred. Upon completion of the print job (i.e., printing of the print data by cloud-connected printer 14), the XMPP connection between client 12 and cloud-connected printer 14 is terminated, as indicated by reference numeral 44.

Client 12 does not send or transmit print data over cloud 18. Rather, rendered print data is sent or transmitted by client 12 directly to printer via a separately established secure connection. This helps to address the above-described concerns associated with sending sensitive documents or other information over the cloud for printing. An additional advantage is that fonts and characters used in connection with a particular document or other information are generally rendered properly so that the output of printer 14 matches the content viewed on client 12.

Figure 3:
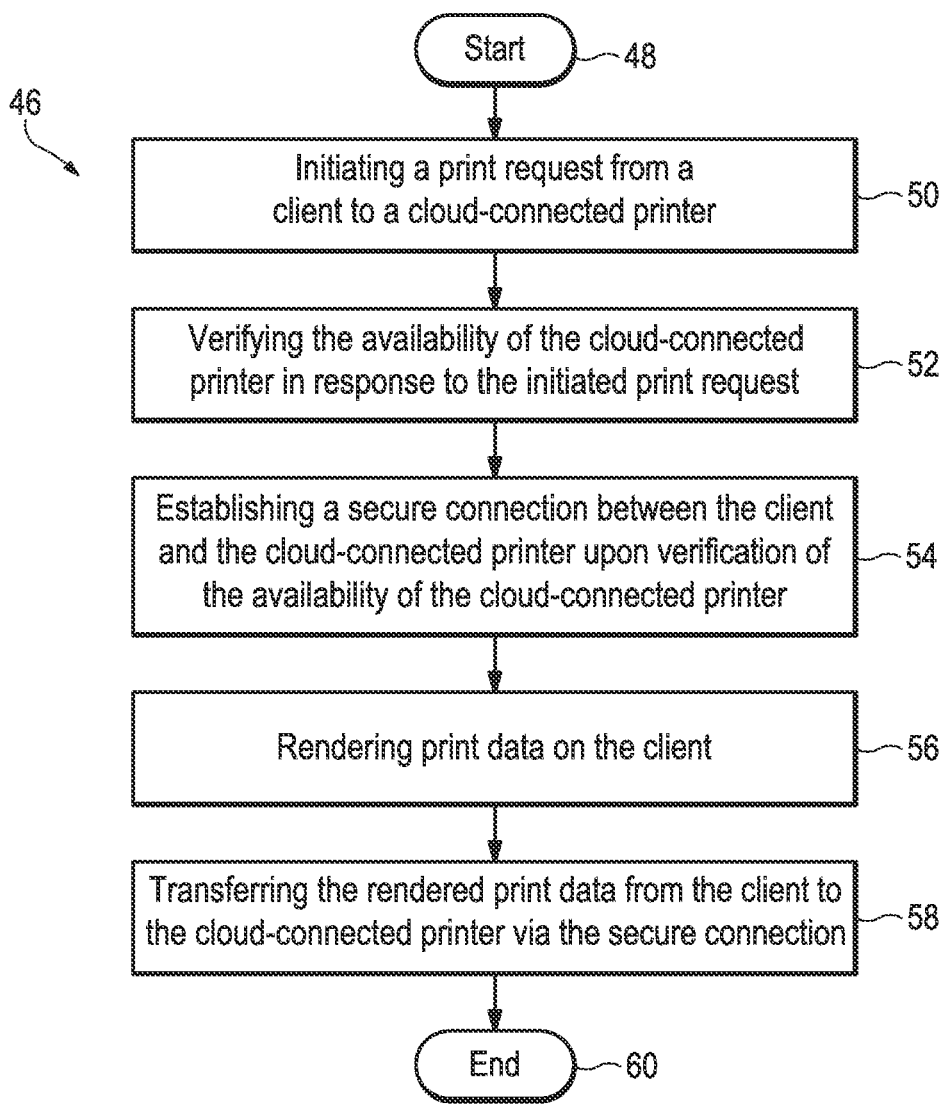
FIG. 3 is an example of a method of secure printing.

An example of a method of secure printing 46 is shown in FIG. 3. As can be seen in FIG. 3, method 46 starts or begins 48 by initiating a print request from a client to a cloud-connected printer, as indicated by block 50, and verifying the availability of the cloud-connected printer in response to the initiated print request, as indicated by block 52. Method 46 continues by establishing a secure connection between the client and the cloud-connected primer upon verification of the availability of the cloud-connected printer, as indicated by block 54, and rendering print data on the client, as indicated by block 56. Method 46 additionally continues by transferring the rendered print data from the client to the cloud-connected printer via the secure connection, as indicated by block 58. Method 46 may then end 60.

The secure connection established between the client and the cloud-connected printer may include a peer-to-peer network. The print request initiated from the client to the cloud-connected printer and/or the verification of the availability of the cloud-connected printer in response to the initiated print request may be conducted oven an unsecure network via the cloud. The secure connection established between the client and the cloud-connected printer may be terminated upon completion of printing of the print data by the cloud-connected printer.

Figure 4:
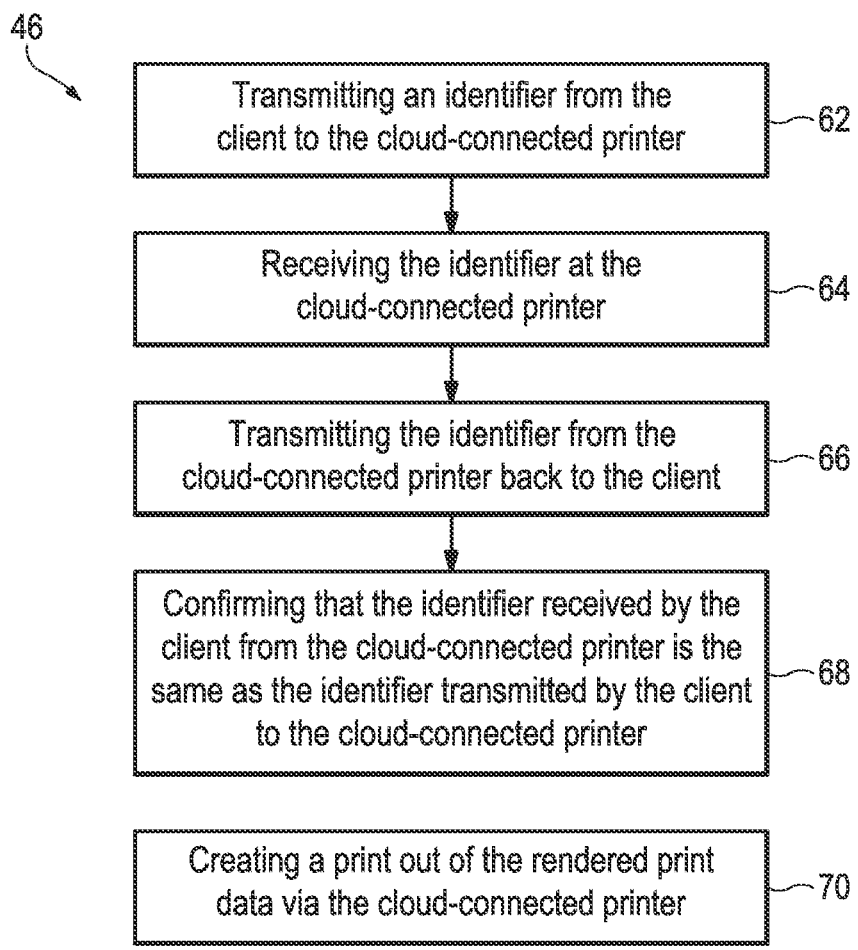
FIG. 4 is an example of additional elements of the method of secure printing of FIG. 3.

An example of additional possible elements of the method of secure printing 46 is shown in FIG. 4. As can be seen in FIG. 4, the element 56 of establishing the secure connection between the client and the cloud-connected printer may include transmitting an identifier from the client to the cloud-connected printer, as indicated by block 62, and receiving the identifier at the cloud-connected printer, as indicated by block 64. Element 56 of method 46 may additionally include transmitting the identifier from the cloud-connected printer back to the client, as indicated by block 66, and confirming that the identifier received by the client from the cloud-connected printer is the same as the identifier transmitted by the client to the cloud-connected printer, as indicated by block 68. As can also be seen in FIG. 4, method 46 may additionally or alternatively include creating a print out of the rendered print data via the cloud-connected printer, as indicated by block 70.

Figure 5:
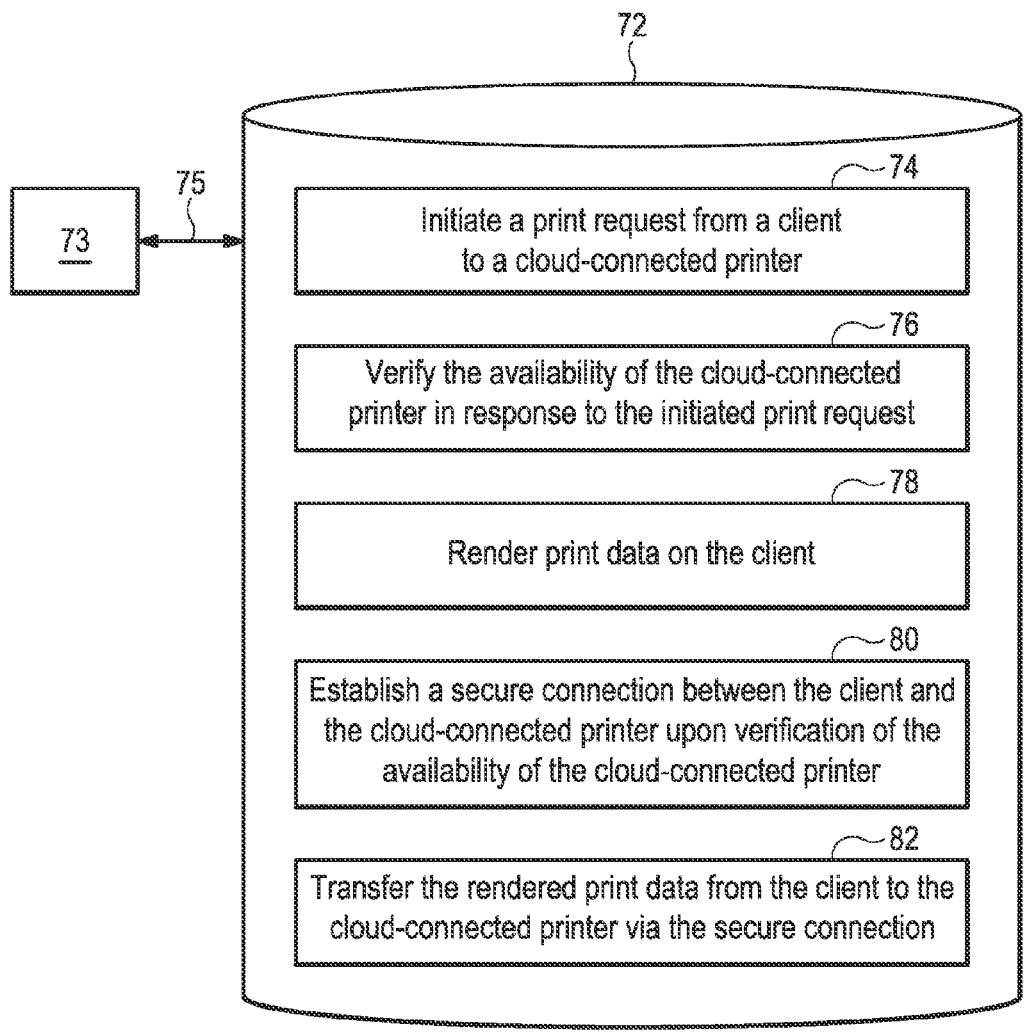
FIG. 5 is an example of a non-volatile storage medium including instructions executable by a processor.

An example of a non-volatile storage medium 72 including instructions executable by a processor 73 coupled to non-volatile storage medium 72, as generally indicated by double-headed arrow 75, is shown in FIG. 5. As can be seen in FIG. 5, non-volatile storage medium 72 includes instructions that, when executed by processor 73, cause processor 73 to initiate a print request from a client to a cloud-connected printer, as indicated by block 74, and verify the availability of the cloud-connected printer in response to the initiated print request, as indicated by block 76. As can also be seen in FIG. 5, non-volatile storage medium 72 includes additional instructions that, when executed by processor 73, cause the processor 73 to render print data on the client, as indicated by block 78, and establish a secure connection between the client and the cloud-connected prime upon verification of the availability of the cloud-connected printer, as indicated by block 80. As can additionally be seen in FIG. 5, non-volatile storage medium 72 also includes instructions that, when executed by processor 73, cause processor 73 to transfer the rendered print data from the client to the cloud-connected printer via the secure connection, as indicated by block 82.

The secure connection established between the client and the cloud-connected printer may include a peer-to-peer network. The print request initiated from the client to the cloud-connected printer and/or the verification of the availability of the cloud-connected printer in response to the initiated print request may be conducted oven an unsecure network via the cloud. The secure connection established between the client and the cloud-connected printer may be terminated upon completion of printing of the print data by the cloud-connected printer. Processor 73 may reside in the client and at least one internet-based server (e.g., XMPP server 26) to which the cloud-connected printer is coupled.

Figure 6:
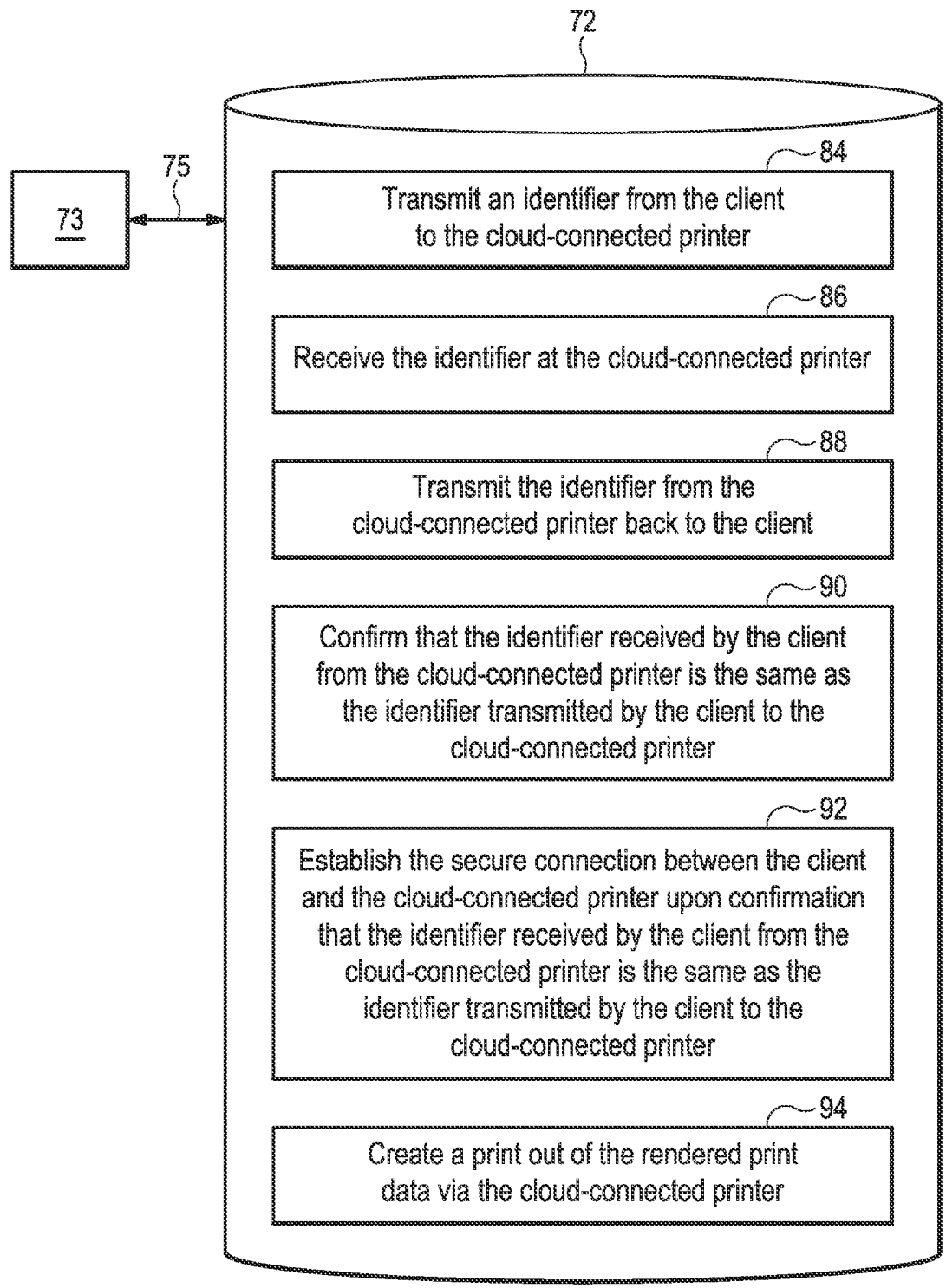
FIG. 6 is an example of additional instructions on the non-volatile storage medium of FIG. 5.

An example of additional possible instructions on non-volatile storage medium 72 is shown in FIG. 6. As can be seen in FIG. 6, non-volatile storage medium 72 may include additional instructions that, when executed by processor 73, cause processor 73 to transmit an identifier from the client to the cloud-connected printer, as indicated by block 84, and receive the identifier at the cloud-connected printer, as indicated by block 86. In such cases, non-volatile storage medium 72 includes additional instructions that, when executed by processor 73, cause processor 73 to transmit the identifier from the cloud-connected printer back to the client, as indicated by block 88, and confirm that the identifier received by the client from the cloud-connected printer is the same as the identifier transmitted by the client to the cloud-connected printer, as indicated by block 90. Also in such cases, non-volatile storage medium 72 includes further instructions that, when executed by processor 73, cause processor 73 to establish the secure connection between the client and the cloud-connected printer upon confirmation that the identifier received by the client from the cloud-connected printer is the same as the identifier transmitted by the client to the cloud-connected printer, as indicated by block 92. As can also be seen in FIG. 6, non-volatile storage medium 72 may additionally or alternatively include instructions that, when executed by processor 73, cause processor 73 to create a print out of the rendered print data via the cloud-connected printer, as indicated by block 94.

Although several examples have been described and illustrated in detail, it is to be clearly understood that the same are intended by way of illustration and example only. These examples are not intended to be exhaustive or to limit the invention to the precise form or to the exemplary embodiments disclosed. Modifications and variations may well be apparent to those of ordinary skill in the art.

Additionally, reference to an element in the singular is not intended to mean one and only one, unless explicitly so stated, but rather means one or more. Moreover, no element or component is intended to be dedicated to the public regardless whether the element or component is explicitly recited in the following claims.

What is claimed is:

1. A server for secure printing, comprising:
    a processor; and
    a memory on which is stored machine readable instructions to cause the processor to:
    receive a print request and identifier from a client;
    verify the availability of a cloud-connected printer;
    transfer the identifier to the available cloud-connected printer; and
    establish a secure connection between the available cloud-connected printer and the client, wherein the available cloud-connected printer is to transmit the identifier to the client via the secure connection established by the server, the client is to confirm that the identifier received from the available cloud-connected printer via the secure connection established by the server is the same as the identifier transmitted to the server by the client, and the client is to transmit rendered print data to the available cloud-connected printer via the secure connection established by the server upon verification of the identifier.

2. The server for secure printing of claim 1, wherein the secure connection between the client and the available cloud-connected printer includes a peer-to-peer network.

3. The server for secure printing of claim 1, wherein the identifier includes a random number generated by the client.

4. The server for secure printing of claim 1, wherein the machine readable instructions are to cause the processor to perform functions of a signaling server and an extensible messaging and presence protocol server.

5. The server for secure printing of claim 1, wherein the machine readable instructions are further to cause the processor to terminate the secure connection established between the client and the available cloud-connected printer upon completion of printing of the rendered print data by the available cloud-connected printer.

6. A method for secure printing, comprising:
    receiving, by a processor of a server, a print request from a client to a cloud-connected printer, the print request including an identifier;
    verifying, by the processor, the availability of the cloud-connected printer in response to the received print request;
    transferring, by the processor, the identifier received from the client to the cloud-connected printer; and
    establishing a secure connection between the client and the cloud-connected printer upon verification of the availability of the cloud-connected printer, wherein the cloud-connected printer is to transmit the identifier to the client via the secure connection, wherein the client is to confirm that the identifier received from the cloud-connected printer is the same as the identifier transmitted to the server, and wherein the client is to render print data and to transfer the rendered print data to the cloud-connected printer via the secure connection in response to the identifier received from the cloud-connected printer being the same as the identifier transmitted to the server.

7. The method of claim 6, wherein establishing the secure connection further comprises establishing a peer-to-peer network between the client and the cloud-connected printer.

8. The method of claim 6, wherein at least one of receiving the print request from the client to the cloud-connected printer and verifying of the availability of the cloud-connected printer in response to the received print request is conducted over an unsecure network.

9. The method of claim 6, wherein the identifier includes a random number generated by the client.

10. The method of claim 6, further comprising terminating the secure connection established between the client and the cloud-connected printer upon completion of printing of the print data by the cloud-connected printer.

11. A non-transitory computer readable storage medium including instructions that, when executed by a processor, cause the processor to:
    generate a print request including a identifier at a client;
    transmit the generated print request including the identifier to a server for secure printing, wherein the server is to transmit the identifier to a cloud-connected printer and to establish a secure connection between the client and the cloud-connected printer;
    receive the identifier from the cloud-connected printer through the secure connection established by the server;
    confirm that the identifier received from the cloud-connected printer is the same as the identifier transmitted to the server;
    render print data; and
    transmit the rendered print data to the cloud-connected printer through the secure connection established by the server following confirmation that the identifier received from the cloud-connected printer is the same as the identified transmitted to the server.

12. The non-transitory computer readable storage medium of claim 11, wherein the secure connection established between client and the cloud-connected printer includes a peer-to-peer network.

13. The non-transitory computer readable storage medium of claim 11, wherein the instructions are to cause the processor to transmit the generate print request to the server over an unsecure network connection.

14. The non-transitory computer readable medium of claim 11, wherein the identifier includes a random number generated by the client.

* * * * *